(12) United States Patent
Jokinen et al.

(10) Patent No.: US 9,417,952 B2
(45) Date of Patent: Aug. 16, 2016

(54) DIRECT MEMORY ACCESS (DMA) UNIT WITH ERROR DETECTION

(71) Applicant: FREESCALE SEMICONDUCTOR, INC., Austin, TX (US)

(72) Inventors: Tommi M. Jokinen, Austin, TX (US); Nikhil Jain, Noida (IN); Stephen G. Kalthoff, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 60 days.

(21) Appl. No.: 14/574,777

(22) Filed: Dec. 18, 2014

(65) Prior Publication Data

US 2016/0179612 A1 Jun. 23, 2016

(51) Int. Cl.
*G06F 11/10* (2006.01)
*H03M 13/00* (2006.01)
*G06F 13/28* (2006.01)
*G06F 13/40* (2006.01)

(52) U.S. Cl.
CPC ............ *G06F 11/1004* (2013.01); *G06F 13/28* (2013.01); *G06F 13/4022* (2013.01)

(58) Field of Classification Search
CPC .... G06F 11/1004; G06F 13/28; G06F 13/402
See application file for complete search history.

(56) References Cited

U.S. PATENT DOCUMENTS

| | | | |
|---|---|---|---|
| 8,566,660 B2 | 10/2013 | Taylor et al. | |
| 2011/0099301 A1 | 4/2011 | Moallem et al. | |
| 2014/0215103 A1* | 7/2014 | Cohen | G06F 13/28 710/23 |

* cited by examiner

Primary Examiner — Sam Rizk

(57) ABSTRACT

Systems and methods for self-checking a direct memory access system are disclosed. These may include generating a check sum value associated with a first job of the plurality of jobs, the first job comprising a read job; if a first predetermined check value is available, comparing the first check sum value with the first predetermined check value; generating a second check sum value associated with a last job of the plurality of jobs, the last job comprising a write job; if a second predetermined check value is available, comparing the second check sum value with the second predetermined check value; and if the second predetermined check value is not available, comparing the first check sum value with the second check sum value.

20 Claims, 4 Drawing Sheets

(12)  United States Patent US 9,417,952 B2

DIRECT MEMORY ACCESS (DMA) UNIT WITH ERROR DETECTION

BACKGROUND

1. Field

This disclosure relates generally to data processing systems, and more specifically, to a data processing system having a direct memory access (DMA) unit.

2. Related Art

Logic verification ensures that a design or the silicon itself is operating as intended. Logic verification becomes increasingly difficult as designs increase in complexity. It becomes difficult to create a logic checker to properly model/check the logic behavior of such designs. Therefore, logic verification often gates the test bench bring-up time or silicon validation. One example of complex design that is difficult to verify is that of a direct memory access (DMA) unit. A DMA may include complex features and modes which make verification difficult and costly. For example, a DMA moves information from one location to another, typically independent of a central processor or central processing unit (CPU). In doing so, the DMA has the ability to access data buffers directly or indirectly using scatter/gather tables and may also perform complex functions such as striding across these buffers. Therefore, a need exists for improved verification for such designs.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A DMA unit may process a chain of data transfer jobs, in which each transfer job moves information from one location to another. Each data transfer job of the chain has a corresponding frame descriptor which defines the job. In one embodiment, mode bits are provided within the frame descriptor for each data transfer job to control error checking features of the data transfer job. In one embodiment, the mode bits indicate when and how cyclical redundancy checking (CRC) is to be performed for the corresponding job. Through the use of these mode bits, a chain including multiple jobs may be self-checked for error within the DMA unit when the chain is processed, even in those cases where intermediate jobs between the first and last job of a chain implement complex formats or features. Therefore, in one embodiment, checksum generators/checkers (e.g. CRC generators/checkers) are included within the DMA unit which snoop the read and write address and data conductors and maintains CRC results for each active chain up to a maximum number of chains supported by the DMA unit.

Figure 1:
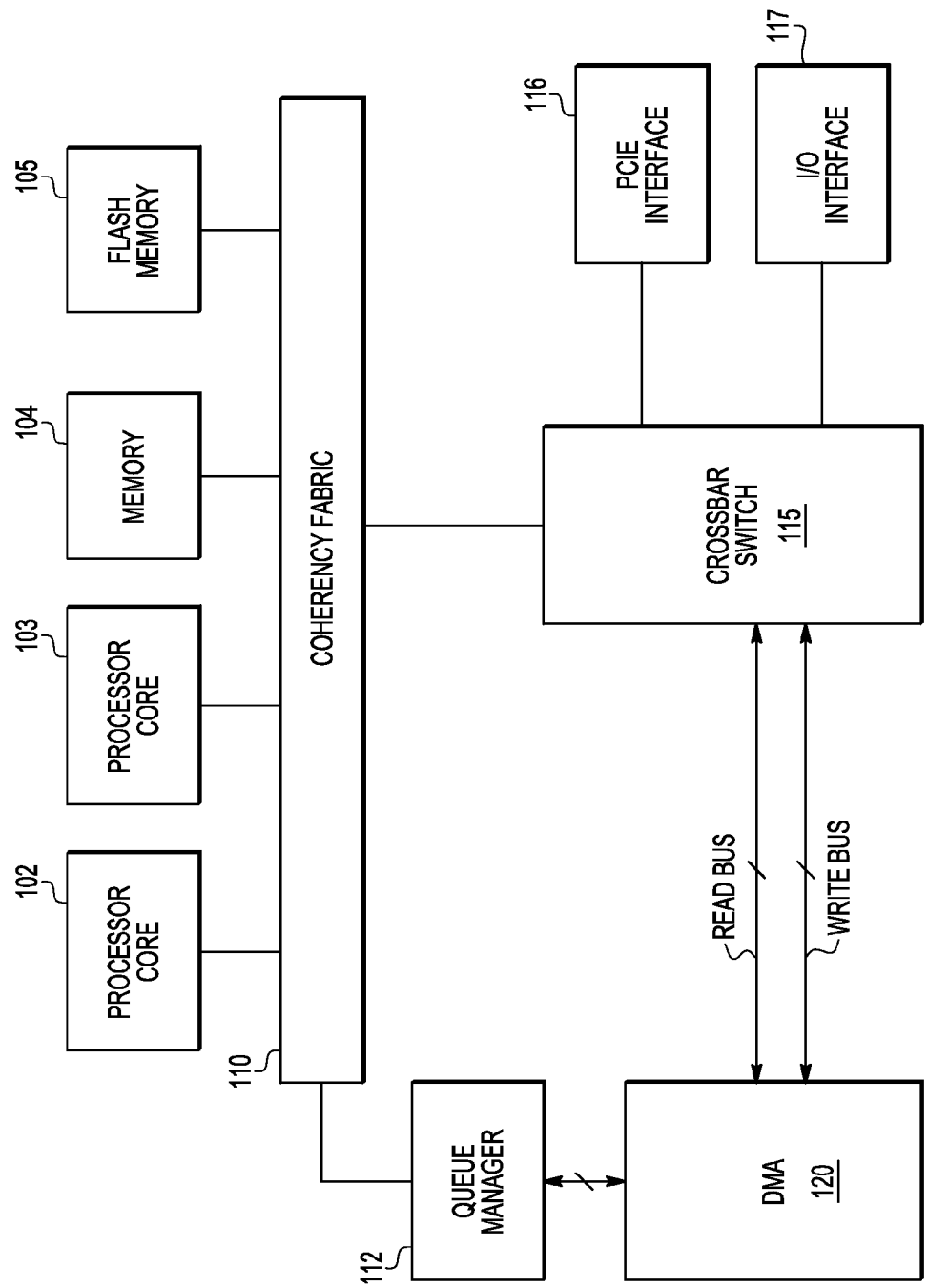
FIG. 1 illustrates, in block diagram form, a data processing system in accordance with one embodiment of the present invention.

FIG. 1 illustrates a data processing system 100 in accordance with one embodiment of the present invention. System 100 includes a number of processors 102 and 103, and memory devices including memory 104 and flash memory 105. System 100 also includes coherency fabric 110, a queue manager 112, a crossbar switch 115, a Peripheral Component Interconnect Express (PCIE) interface 116, an input/output (I/O) interface 117, and a DMA unit 120. Processors 102 and 103, memory 104 and flash memory 105, queue manager 112, and crossbar switch 115 are each coupled to coherency fabric 110. The PCIE interface 116 and I/O interface 117 are each coupled to the crossbar switch 115. DMA unit 120 is coupled to crossbar switch 115 and queue manager 112.

Processors 102 and 103 are each configured to execute sets of instructions in order to carry out designated tasks. In the course of executing instructions, processors 102 and 103 can generate transfer requests to transfer data from a source to a destination. Each transfer of data may be referred to as a job. Based on each transfer request, processors 102 and 103 generate a corresponding frame descriptor (also referred to as a transfer descriptor) which describes the job. Therefore, each frame descriptor provides various types of information for completing the job, such as, for example, the source, the destination, and the amount of data to be transferred. An example frame descriptor will be described in reference to FIG. 3 below.

Memory 104 and flash memory 105 can each be a transfer source or a transfer destination for a job. In particular, memory 104 is a volatile memory, such as a random access memory (RAM) module, that stores and provides data in response to transfer requests. Accordingly, data can be stored in memory 104 based on a data transfer in which memory 104 is the transfer destination, and data can be retrieved from memory 104 based on a data transfer in which memory 104 is the transfer source. Flash memory 105 is a flash memory device that stores and provides data in response to transfer requests. In similar fashion to memory 104, data can be stored or retrieved from flash memory 104 based on transfers having the flash memory 104 as the destination or the source, respectively.

Other examples of transfer sources and destinations in system 100 include PCIE interface 116 and I/O interface 117. PCIE interface 116 provides a physical and logical layer interface to one or more peripheral devices (not shown). Data can be provided to or retrieved from the peripheral devices via PCIE interface 116 based on transfers that respectively identify PCIE interface 116 as the destination or the source. I/O interface 117 provides a physical and logical layer interface to one or more input and output devices (not shown). In similar fashion to PCIE interface 116, data is retrieved and provided to the input and output devices based on data transfers that respectively identify I/O interface 117 as the destination or the source of the transfer.

Coherency fabric 110 and crossbar switch 115 provide the communication backbone for data transfers, as well as communication of other information such as frame descriptors. In particular, coherency fabric 110 provides a communication backbone for communications among the processors 102 and 103, memory 104, flash memory 105, queue manager 112, and crossbar switch 115. Coherency fabric 110 can also manage the coherency of data between processors 102 and 103, memory 104, and flash memory 105. For example, coherency fabric 110 can maintain coherency state information, service coherency probes, and the like. Crossbar switch 115 is a switch fabric that can route communications among DMA unit 120, PCIE interface 116, I/O interface 117, and coherency fabric 110.

Queue manger 112 stores the frame descriptors. DMA unit 120 is a module that can effectuate a data transfer based on a stored frame descriptor. As described further herein with respect to FIG. 2, DMA unit 120 communicates with crossbar switch 115 by way of a read bus and a write bus and includes a read data engine and a write data engine. DMA unit 120 retrieves data from the source indicated by the frame descriptor, stores the data at a buffer of DMA unit 120, and forwards the stored data to the destination indicated by the frame descriptor.

In operation, processor 102 or 103 can initiate a data transfer job by providing a frame descriptor for the data transfer job to be stored and managed by queue manager 112. When DMA unit 120 is available to process a job, DMA unit 120 obtains a frame descriptor corresponding to a job from queue manager 112. Note that each job stored in queue manager 112 may correspond to a chain of jobs. Each job within a chain is assigned a same chain identifier (chain ID) which is included within the frame descriptor of the job. Therefore, a chain may include any number of jobs, i.e., any number of data transfers.

DMA unit 120 can read/write data from a single buffer or multiple buffers, which may be presented as scatter/gather (S/G) tables in memory. Furthermore, DMA unit 120 may implement other features which affect how data is read or written and how addresses are generated. For example, a data transfer may be defined as being prefetchable or cacheable, or may implement source/destination striding. In the case of striding, a stride size and stride distance are defined as part of the data transfer which causes DMA unit 120 to skip data as the data is being read or written. Therefore, striding allows for reading from or writing to non-sequential addresses. For DMA unit 120, a job refers to a data transfer with its corresponding attributes and is described by a frame descriptor.

Figure 2:
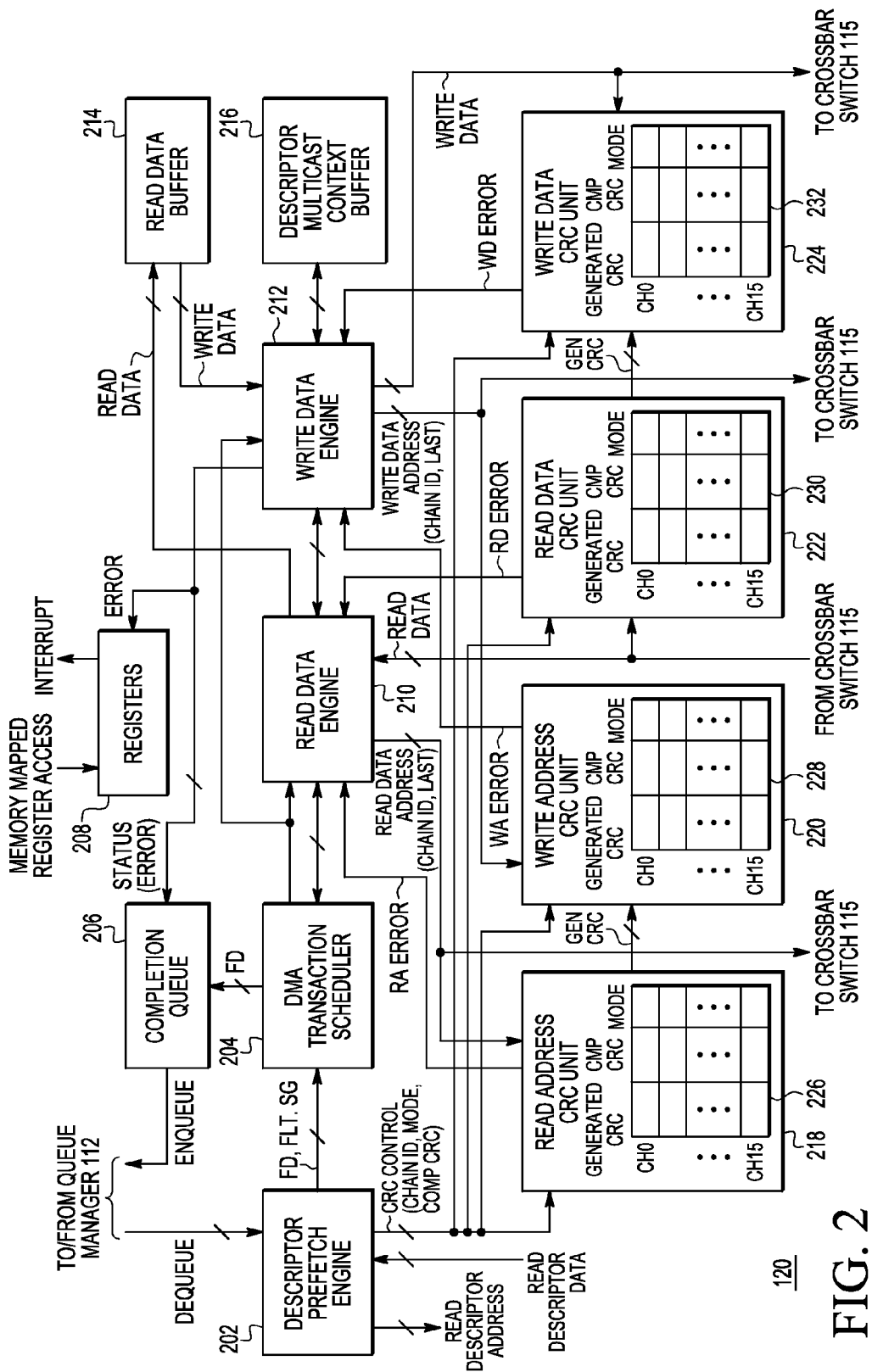
FIG. 2 illustrates, in block diagram form, a DMA unit of FIG. 1 in accordance with one embodiment of the present invention.
Figure 3:
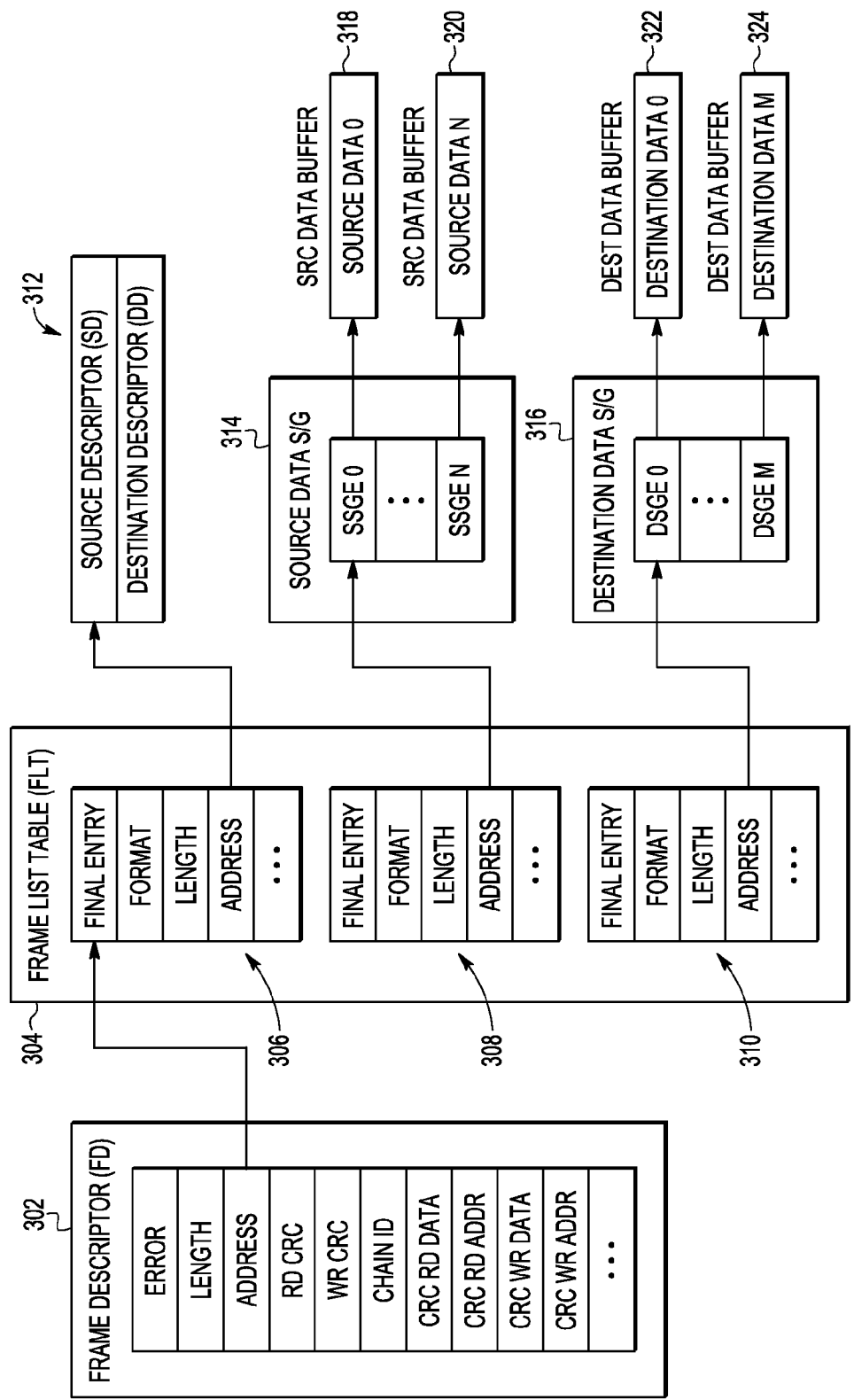
FIG. 3 illustrates, in diagrammatic form, a frame descriptor (FD) in accordance with one embodiment of the present invention.

FIG. 3 illustrates an example frame descriptor (FD) 302 for a particular data transfer job which includes an error indicator, a length (i.e. size) of the data transfer, an address for a frame list table (FLT) 304 for the job, a read CRC mode indicator (RD CRC), a write CRC mode indicator (WR CRC), a chain identifier (ID), a CRC read data value (CRC RD data), a CRC read address value (CRC RD addr), a CRC write data value (CRC WR data), and a CRC write address (CRC WR addr). The error value is asserted if the data transfer job resulted in an error. The CRC RD data, CRC RD addr, CRC WR data, and CRC WR addr correspond to user provided values which are stored within FD 302. These user provided values will be described in more detail below in reference to FIG. 2.

FLT 304 stores a plurality of entries 306, 308, and 310 which further define the data transfer job. Each entry of FLT 304 includes a final entry value, a format value, a length value, and an address value. The final entry value provides an indication of whether the current entry is a final entry of FLT 304. The format provides information as to the format of the data pointed to by the address value in the entry. The format can indicate that the address value points to a single buffer or may instead indicate a S/G table. A single buffer refers to an address location which directly stores the information, and an S/G table refers to a list of one or more pointers (i.e. addresses) which store the information. A S/G table is able to define multiple buffer locations which may or may not be contiguous in memory. For example, the multiple buffer locations may be non-continuous. The length provides the size of the information pointed to by the address value.

Referring to entry 306, the final entry indicates that entry 306 is not a final entry of FLT 304, the format indicates a single buffer, and the address points to descriptor buffer 312 which includes a source descriptor (SD) and a destination descriptor (DD). SD provides a description of the source, which indicates attributes of the source such as whether the data transfer job is a prefetchable (or cacheable) data transfer, a strided data transfer, or a multicast data transfer. DD provides a description of the destination, which indicates attributes of the destination such as whether the data transfer job is a prefetchable (or cacheable) data transfer, a strided data transfer, or a multicast data transfer. For the striding, the SD or the DD also includes the stride size and stride distance. Attributes of the source and destination can therefore be independently defined.

Referring to entry 308, the final entry indicates that entry 308 is not a final entry of FLT 304, the format indicates a S/G table, and the address points to a source data S/G table 314. Source data S/G table 314 includes N+1 source S/G entries, SSGE0-SSGEN, which indicate the locations of the source data. Each entry provides the address of a corresponding source data buffer which stores a portion of the source data. For example, SSGE0 provides the address location of source data buffer 318 which stores source data 0, and SSGEN provides the address location of source data buffer 320 which stores source data N. Note that each entry in source data S/G table 314 provides the address location of a corresponding source data portion, source data 0-source data N. Note that the source buffers pointed to by the entries of S/G table 314 may or may not be contiguous in memory. Also, the format in entry 308 may indicate a single buffer rather than a S/G table in which there is no additional level of indirection as is provided by a S/G table.

Referring to entry 310, the final entry indicates that entry 310 is the final entry of FLT 304, the format indicates a S/G table, and the address points to a destination data S/G table 316. Destination data S/G table 316 includes M+1 destination S/G entries, DSGE0-DSGEM, which indicate the locations where the destination data will be stored. Each entry provides the address of a corresponding destination data buffer which will receive a portion of the destination data (which corresponds to the transferred source data). For example, DSGE0 provides the address location of destination data buffer 322 which is used to receive destination data 0, and DSGEM provides the address location of destination data buffer 324 which is used to receive destination data M. Note that each entry in destination data S/G table 316 provides the address location of a destination data location which receives a corresponding destination data portion, destination data 0-destination data M. Note that the destination buffers pointed to by the entries of S/G table 316 may or may not be contiguous in memory. Also, the format in entry 308 may indicate a single buffer rather than a S/G table in which there is no additional level of indirection as is provided by a S/G table. In one embodiment, N may be equal to M.

The frame descriptors (such as FD 302), the frame lists tables (such as FLT 304), the source descriptors, the destination descriptors, the S/G tables (such as tables 314 and 316), and the source and destination data buffers (such as buffers 318, 320, 322, and 324) may be stored in memory, such as memory 104 or flash memory 105. For example, a frame descriptor may be formed and provided to queue manager 112 for storage, and the addresses in the frame descriptor, frame list table, and S/G tables may refer to address locations of memory 104 or flash memory 105.

FIG. 2 illustrates, in block diagram form, DMA unit 120 in further detail, in accordance with one embodiment of the present invention. DMA unit 120 includes a completion queue 206, registers 208, a descriptor prefetch engine 202, a DMA transaction scheduler 204, a read data engine 210, a write data engine 212, a read data buffer 214, a destination multicast context buffer 216, a read address cyclical redundancy check (CRC) unit 218, a write address CRC unit 220, a read data CRC unit 222, and a write data CRC unit 224. Descriptor prefetch engine 202 is coupled to receive dequeued FDs from queue manager 112, to provide a read descriptor address, to receive read descriptor data, to provide an FD and FLT to DMA transaction scheduler 204, and to provide CRC control information (such as a chain ID, mode, and comparand CRC) to each of CRC units 218, 220, 222, and 224. DMA transaction scheduler 204 is coupled to read data engine 210 and write data engine 212. Read data engine 210 is coupled to write data engine 212. Read data engine 210 is coupled to provide read data to read data buffer 214 and read data buffer 214 is coupled to provide write data to write data engine 212. Write data engine 212 is coupled to destination multicast context buffer 216. Read data engine 210 is coupled to provide a read data address (including a chain ID and last indicator) to read address CRC unit 218 and to cross bar switch 115. Read data engine 210 is coupled to receive read data from crossbar switch 115 and to receive a read address error (RA error) from read address CRC unit 218 and a read data error (RD error) from read data CRC unit 222. Write data engine is coupled to provide an error indicator to registers 208 and coupled to provide status information (including the error indicator) to completion queue 206. Completion queue 206 is coupled to provide FDs for completed jobs to be enqueued to queue manager 112. Write data engine 212 is coupled to provide a write data address (which includes a chain ID and a last indicator) to write address CRC unit 220 and to crossbar switch 115. Write data engine 212 is coupled to provide write data to write data CRC unit 224 and to crossbar switch 115. Write data engine 212 is coupled to receive a write address error (WA error) from write address CRC unit 220 and a write data error (WD error) from write data CRC unit 224. Read address CRC unit 218 is coupled to write address CRC unit 220, and read data CRC unit 222 is coupled to write data CRC unit 224.

Write address CRC unit 218 includes a CRC table 226, write address unit CRC unit 220 includes a CRC table 220, read data CRC unit 222 includes a CRC table 230, and write data CRC unit includes a CRC table 232. Each of the CRC tables store information related to each active chain being processed by DMA unit 120. In the illustrated embodiment, system 100 is able to manage up to 16 job chains, chain0-chain15. Alternate embodiments may support any number of chains. In this case, the CRC table of each CRC unit is capable of storing the corresponding information for each chain, up to the number of chains supported by system 100.

In operation, DMA unit 120 transfers data from one location to another, as described by a particular frame descriptor. The frame descriptor provides the source location and the destination location for the data being moved, as well as other attributes of the data transfer. When DMA unit 120 is available to process another data transfer job, DMA unit 120 obtains another frame descriptor from queue manager 112. In the illustrated embodiment, descriptor prefetch engine 202 of DMA unit 120 dequeues a next frame descriptor to be processed from queue manager 112. Descriptor prefetch engine 202 provides a read descriptor address to crossbar switch 115 which routes the read request to the appropriate memory location (e.g., memory 104 or flash memory 105). The read descriptor data, which was stored at the read descriptor address, is returned to descriptor prefetch engine 202 by way of crossbar switch 115. This read descriptor data may include, for example, the FLT pointed to by the FD and the S/G tables. Descriptor prefetch engine 202 may work ahead to save time. For example, as DMA unit 120 processes a current data transfer job, descriptor prefetch engine 202 may prefetch the read descriptor data for a next FD dequeued from queue manager 112. Descriptor prefetch engine 202 provides the FD and read descriptor data to DMA transaction scheduler 204 which assigns appropriate tasks of the job to read data engine 210 and write data engine 212. DMA transaction scheduler 204 also provides the FD to completion queue 206 to await completion of the data transfer job. Note that, in the illustrated embodiment, a single read data engine and write data engine is indicated. However, in alternate embodiments, any number of read data and write data engines may be present and would be managed by DMA transaction scheduler 204.

Read data engine 210 controls obtaining the data from the source locations indicated by the FD for the current data transfer job. Read data engine 210 provides a read data address to crossbar switch 115 which routes the read data address to the appropriate memory (e.g. memory 104 or memory 105). In response, the addressed memory provides read data by way of crossbar switch 115 back to DMA unit 120. The read data is returned to read data engine 210 which stores the read data to read data buffer 214. Read data engine 210 generates the read addressees in accordance with the FLT which indicates the format and location of the source data, as well as any corresponding attributes. For example, if striding is required for a current job, the SD would provide the stride distance and size so that read data engine 210 may appropriately generate a next read data address.

Write data engine 212 controls providing the received data to the destination locations indicated by the FD for the current data transfer job. Write data engine 212 provides a write data address and write data to crossbar switch 115 which routes the write data address and write data to the appropriate memory (e.g. memory 104 and memory 105). The write data is therefore stored into the write data address. Note that write data engine 212 obtains the write data from read data buffer 214. Write data engine 212 generates the write addressees in accordance with the FLT which indicates the format and location of the destination, as well as any corresponding attributes. For example, if striding is required for a current job, the DD would provide the stride distance and size so that write data engine 210 may appropriately generate a next write data address.

Upon completion of a write of a last portion of data of a data transfer job, write data engine 212 notifies completion queue 206 accordingly. For example, write data engine 212 provides an indication that the data transfer is complete and any associated status information, such as an error indicator which indicates whether or not the data transfer completed successfully or resulted in an error. Completion queue 206 updates the FD for the current job (which was originally received from DMA transaction scheduler 204 at the start of the current job) and provides the completed FD to queue manager 112. For example, completion queue 206 asserts the error indicator of the FD if an error occurred while processing the job (e.g. if any of WA error, WD error, RA error, or RD error were asserted, as will be described below.) Write data engine 212 also provides the error indicator to registers 208. If an error has occurred and the error indicator is asserted, an interrupt may be generated and sent back to the processor which created the job.

Registers 208 is a memory mapped set of registers which may be accessible by a processor core or other master of system 100 and programmed as needed. For example, these registers may store global status information and control and configuration settings for the DMA (e.g. errors, access control, interrupt steering, etc.). Destination multicast context buffer 216 provides context information to write data engine 212 for multicasting of write addresses and write data to multiple destinations. Multicast context buffer 216 stores intermediate breakpoint data such as length and addresses.

During the transfer of data, errors may occur at various different points. For example, errors may occur with the read data address, the read data, the write data address, and the write data. Therefore, DMA unit 120 includes read address CRC unit 218, which performs error checking on the read data address and provides RA error accordingly, write address CRC unit 220, which performs error checking on the write data address and provides WA error accordingly, read data CRC unit 222, which performs error checking on the read data and provides RD error accordingly, and write data CRC unit 224, which performs error checking on the write data and provides WD error accordingly. Therefore, when read data engine 210 provides the read data address to crossbar switch 115, the read data address (along with the corresponding chain ID and in indication of whether the generated read address is the last read address of the source data) is also provided to read address CRC unit 218 for error checking. When read data is returned to read data engine 210 from crossbar switch 115, it is also provided to read data CRC unit 222 for error checking. Similarly, when write data engine 212 provides the write data address to crossbar switch 115, the write data address (along with the corresponding chain ID and in indication of whether the generated write address is the last write address of the destination) is also provided to write address CRC unit 220 for error checking, and when write data engine 212 provides the write data to crossbar switch 115, the write data is also provided to write data CRC unit 224 for error checking.

Each entry in each CRC unit 218, 220, 222, and 224 includes a generated CRC field configured to store a generated CRC checksum value for the corresponding chain ID, a comparand CRC field configured to store a comparand CRC value which may be a user provided value or a generated CRC value provided from another CRC unit, and a mode field configured to store a CRC mode indicator (also referred to as CRC mode bits). Therefore, note that an FD may include a read CRC mode indicator, RD CRC, and a write CRC mode indicator, WR CRC, and may include user provided comparand CRC values, such as CRC RD Data, CRC RD Addr, CRC WR Data, and CRC WR Addr. Also, read address CRC unit 218 may provide a generated CRC value to write address CRC unit 220, and read data CRC unit may provide a generated CRC value to write data CRC unit 224.

Upon providing an FD to DMA transaction scheduler 204, descriptor prefetch engine 202 also provides CRC control information to each of the CRC units. This CRC control information may include the chain ID, the mode, and comparand CRC values. For example, these values may correspond to the chain ID, RD CRC, WR CRC, CRC RD Data, CRC RD Addr, CRC WR Data, and CRC WR Addr provided as part of the FD (as illustrated, for example, in FD 302 of FIG. 3). Note that each control value may not be provided to every CRC unit. For example, the CRC control information provided from descriptor prefetch engine 202 to read address CRC unit 218 includes the chain ID and the RD CRC mode bits. The CRC control information may further include the CRC RD Addr value, if needed. The CRC control information provided from descriptor prefetch engine 202 to write address CRC unit 220 includes the chain ID and the WR CRC mode bits, and may also include the CRC WR Addr value if needed. The CRC control information provided from descriptor prefetch engine 202 to read data CRC unit 222 includes the chain ID and the RD CRC mode bits. The CRC control information may further include the CRC RD Data value, if needed. The CRC control information provided from descriptor prefetch engine 202 to write data CRC unit 224 includes the chain ID and the WR CRC mode bits. The CRC control information may further include the CRC WR Data value, if needed.

In one embodiment, the error checking performed by each CRC unit corresponds to a cyclical redundancy check in which checkbits are generated and compared to an expected CRC value. In alternate embodiments, different error checking algorithms may be implemented, other than CRC. In these embodiments, the checkbits would be generated in accordance with the particular error checking algorithm. However, for ease of description, the embodiment of FIG. 2 will be described in reference to CRC.

For each FD (i.e. data transfer job) processed by DMA unit 120, the CRC mode bits indicate what type of error checking function is to be performed for a particular aspect of the job. The CRC mode bits, received by each CRC unit as part of the CRC control bits from descriptor prefetch engine 202, are stored in the mode field of the appropriate entry in each CRC unit as identified by the chain ID, which is also received as part of the CRC control bits. Based on the mode of a particular job, a user provided CRC comparand value may also be provided as part of the CRC control information to the appropriate CRC unit. If a CRC comparand value is received by a CRC unit, it is stored into the CRC comparand field of the appropriate entry as identified by the chain ID.

With respect to the mode bits, the RD CRC mode bits define actions for read CRC generation. These mode bits are stored into the appropriate entry of read address CRC unit 218 and read data CRC unit 222. In one embodiment, the RD CRC mode bits is a 3-bit value which allows for the definition of up to 8 modes. Alternatively, any number of bits may be used depending on the number of modes being defined. A first value, such as 0bx00 (in which x indicates a "don't care" value), indicates that no error checking is performed.

A second value for RD CRC mode bits, such as 0b001, indicates that a CRC checksum value is generated for read data for the corresponding chain ID. Therefore, when read data CRC unit 222 receives read data for a particular chain ID and the mode field for the entry corresponding to the chain ID has the second value, read data CRC unit 222 generates a CRC checksum value for the received read data and stores the CRC checksum value into the generated CRC field of the entry corresponding to the chain ID.

A third value for RD CRC mode bits, such as 0b010, indicates that a CRC checksum value is generated for a read data address for the corresponding chain ID. Therefore, when read address CRC unit 218 receives a read data address for a particular chain ID and the mode field for the entry corresponding to the chain ID has the third value, read address CRC unit 218 generates a CRC checksum value for the received data and stores the CRC checksum value into the generated CRC field of the entry corresponding to the chain ID.

A fourth value for RD CRC mode bits, such as 0b011, indicates that a CRC checksum value is generated for both a read data address for the corresponding chain ID and for read data for the corresponding chain ID. Therefore, when read data CRC unit 222 receives read data for a particular chain ID and the mode field for the entry corresponding to the chain ID has the fourth value, read data CRC unit 222 generates a CRC checksum value for the received read data and stores the CRC checksum value into the generated CRC field of the entry corresponding to the chain ID. When read address CRC unit 218 receives a read data address for a particular chain ID and the mode field for the entry corresponding to the chain ID has the fourth value, read address CRC unit 218 generates a CRC checksum value for the received data and stores the CRC checksum value into the generated CRC field of the entry corresponding to the chain ID.

A fifth value for RD CRC mode bits, such as 0b101, indicates that a CRC checksum value is generated for read data for the corresponding chain ID and that checksum value is then checked against a user provided checksum value (which is stored in the comparand CRC field of the entry corresponding to the chain ID). Therefore, when read data CRC unit 222 receives read data for a particular chain ID and the mode field for the entry corresponding to the chain ID has the fifth value, read data CRC unit 222 generates a CRC checksum value for the received read data, stores the CRC checksum value into the generated CRC field of the entry corresponding to the chain ID, and performs a comparison of the generated CRC checksum value with the comparand CRC value from the entry corresponding to the chain ID. If the comparison indicates a mismatch, an error is indicated and read data CRC unit 222 asserts RD error to indicate an error occurred with the read data. If the comparison indicates a match, RD error is remains negated. RD error is provided to read data engine 210, and read data engine 210 communicates it to write data engine 212.

A sixth value for RD CRC mode bits, such as 0b110, indicates that a CRC checksum value is generated for a read data address for the corresponding chain ID and that checksum value is then checked against a user provided checksum value (which is stored in the comparand CRC field of the entry corresponding to the chain ID). Therefore, when read address CRC unit 218 receives read data address for a particular chain ID and the mode field for the entry corresponding to the chain ID has the sixth value, read address CRC unit 218 generates a CRC checksum value for the received read data address, stores the CRC checksum value into the generated CRC field of the entry corresponding to the chain ID, and performs a comparison of the generated CRC checksum value with the comparand CRC value from the entry corresponding to the chain ID. If the comparison indicates a mismatch, an error is indicated and read address CRC unit 218 asserts RA error to indicate an error occurred with the read data address. If the comparison indicates a match, RA error is remains negated. RA error is provided to read data engine 210 and read data engine 210 communicates it to write data engine 212.

A seventh value for RD CRC mode bits, such as 0b111, indicates that a checksum value is generated for both a read data address and the read data for the corresponding chain ID and the generated checksum values are checked against a corresponding user provided checksum value obtained from the comparand CRC field of the appropriate entries of read address CRC unit 218 and read data CRC unit 222, respectively. As described above, if either of the comparisons indicate a mismatch, the corresponding error signal, RA error or RD error, is asserted.

With respect to the mode bits, the WR CRC mode bits define actions for write CRC generation. These mode bits are stored into the appropriate entry of write address CRC unit 220 and write data CRC unit 224. In one embodiment, the WR CRC mode bits is a 3-bit value which allows for the definition of up to 8 modes. Alternatively, any number of bits may be used depending on the number of modes being defined. A first value, such as 0bx00 (in which x indicates a "don't care" value), indicates that no error checking is performed.

A second value for WR CRC mode bits, such as 0b001, indicates that a CRC checksum value is generated for the write data for the corresponding chain ID, and this generated checksum value is checked against the checksum value which was generated when the data was read. Therefore, when write data CRC unit 224 receives write data for a particular chain ID and the mode field for the entry corresponding to the chain ID has the second value, write data CRC unit 224 generates a CRC checksum value for the write data and stores the CRC checksum value into the generated CRC field of the entry corresponding to the chain ID. Write data CRC unit 224 also receives the checksum value which was generated by read data CRC unit 222 when the data was read. This checksum value is provided from the generated CRC field of the entry in read data CRC unit 222 corresponding to the chain ID. Write data CRC unit 224 compares the checksum value generated for the write data with the generated CRC checksum value received from read data CRC unit 222. If a mismatch occurs, write data CRC unit 224 asserts WD error, which is provided to write data engine 212. If a match occurs, WD error remains negated.

A third value for WR CRC mode bits, such as 0b010, indicates that a CRC checksum value is generated for a write data address for the corresponding chain ID, and this generated checksum value is checked against the checksum value which was generated from the read data address. Therefore, when write address CRC unit 220 receives a write data address for a particular chain ID and the mode field for the entry corresponding to the chain ID has the third value, write address CRC unit 220 generates a CRC checksum value for the write address and stores the CRC checksum value into the generated CRC field of the entry corresponding to the chain ID. Write address CRC unit 220 also receives the checksum value which was generated for the read address by read address CRC unit 218. This checksum value is provided from the generated CRC field of the entry in read address CRC unit 218 corresponding to the chain ID. Write address CRC unit 220 compares the checksum value generated for the write data address with the generated CRC checksum value received from read address CRC unit 218. If a mismatch occurs, write address CRC unit 220 asserts WA error, which is provided to write data engine 212. If a match occurs, WA error remains negated.

A fourth value for WR CRC mode bits, such as 0b011, indicates that a CRC checksum value is generated for both a write data address for the corresponding chain ID and for the write data for the corresponding chain ID, and these generated checksum values are checked against the checksum values which were previously generated by read address CRC unit 218 and read data CRC unit 222. As discussed above with the second and third values for the WR CRC mode bits, the previously generated CRC checksum values are provided from the entries corresponding to the chain ID of read address CRC unit 218 and read data CRC unit 222 to write address CRC unit 220 and write data CRC unit 224, respectively. If a mismatch occurs for the address checksum values, write address CRC unit 220 asserts WA error, and if a mismatch occurs for the data checksum values, write data CRC unit 224 asserts WD error.

A fifth value for WR CRC mode bits, such as 0b101, indicates that a CRC checksum value is generated for write data for the corresponding chain ID and that checksum value is then checked against a user provided checksum value (which is stored in the comparand CRC field of the entry corresponding to the chain ID). Therefore, when write data CRC unit 224 receives write data for a particular chain ID from write data engine 212 and the mode field for the entry corresponding to the chain ID has the fifth value, write data CRC unit 224 generates a CRC checksum value for the received write data, stores the CRC checksum value into the generated CRC field of the entry corresponding to the chain ID, and performs a comparison of the generated CRC checksum value with the comparand CRC value from the entry corresponding to the chain ID. If the comparison indicates a mismatch, an error is indicated and write data CRC unit 224 asserts WD error to indicate an error occurred with the write data. If the comparison indicates a match, WD error remains negated. WD error is provided to write data engine 212.

A sixth value for WR CRC mode bits, such as 0b110, indicates that a CRC checksum value is generated for a write data address for the corresponding chain ID and that checksum value is then checked against a user provided checksum value (which is stored in the comparand CRC field of the entry corresponding to the chain ID). Therefore, when write address CRC unit 220 receives a write data address for a particular chain ID and the mode field for the entry corresponding to the chain ID has the sixth value, write address CRC unit 220 generates a CRC checksum value for the received write data address, stores the CRC checksum value into the generated CRC field of the entry corresponding to the chain ID, and performs a comparison of the generated CRC checksum value with the comparand CRC value from the entry corresponding to the chain ID. If the comparison indicates a mismatch, an error is indicated and write address CRC unit 222 asserts WA error to indicate an error occurred with the write data address. If the comparison indicates a match, WA error remains negated. WA error is provided to write data engine 212.

A seventh value for WR CRC mode bits, such as 0b111, indicates that a checksum value is generated for both a write data address and the write data for the corresponding chain ID and the generated checksum values are checked against a corresponding user provided checksum value obtained from the comparand CRC field of the appropriate entries of write address CRC unit 220 and write data CRC unit 224, respectively. As described above, if either of the comparisons indicate a mismatch, the corresponding error signal, WA error or WD error, is asserted.

Therefore, by setting the RD CRC mode bits and WR CRC mode bits to appropriate values, various different types of error checking may be performed. Write data engine 212 receives the error indicators, such as RA error, WA error, RD error, and WD error, and provides an overall error indicator to completion queue 206 to update the completed FD accordingly. Furthermore, if an error occurs, write data engine 212 may provide an error indicator to registers 208 which may trigger an interrupt for system 100. Circuitry within DMA unit 120 (not shown) can control the generation of interrupts upon errors occurring.

In one embodiment, for above examples, any value for the RD CRC mode bits and WR CRC mode bits which includes a 0b1xx combination, the comparison is performed against a user provided checksum value once the last address or last data of a particular job is received.

The use of the mode bits for error checking allows for self-checking within DMA unit 120. By including the mode bits as part of a FD for a job, the appropriate CRC unit can perform different types of error checking and assert error indictors in response thereto, which are provided back to the completed queue. Furthermore, a chain of jobs can be checked for errors without having to examine each intervening step of the chain. Also, data transfer jobs can be checked regardless of the formats supported by DMA unit 120. That is, the modes may be used for error checking even when data formats change within a job chain, such as when striding or S/G buffers are used.

In order to obtain the desired type of error checking for a job chain, the mode bits may be set accordingly. In one example, data only self-checking may be implemented for a chain. For data only self-checking (in which read and write data is checked, and not the read and write addresses), the RD CRC mode bits are set to 0b001 (as described above) for the first job in the chain and the WR CRC mode bits are set to 0b001 (as described above) for the last job in the chain. In order to perform the data only self-checking, the read effective length for the first job in the chain should be identical to the write effective length for the last job in the chain. Also, the first job should be non-prefetchable. That is, either the exact bytes should be read rather than prefetching a full line of data which includes the desired bytes or the desired bytes should be aligned to the bus size. In this manner, it can be ensured that the read data used in generating the checksum is known or expected data. If the read data includes unknown or unexpected data, the checksum is unpredictable. By setting the RD CRC mode bits appropriately for the first job and the WR CRC mode bits appropriately for the last job, and following the above parameters, intermediate jobs within the chain, between the first and last jobs, may include complex formats, such as striding, prefetchable, S/G formats, throttling, misalignment, or the like). If the comparison of the checksum values between the data read at the first job and the data written for the last job do not match, then the error indicator in the FD of the last job is asserted to indicate an error occurred in the chain.

In another example, address and data checking are implemented for a chain. For this type of error checking, the RD_CRC mode bits are set to 0b011 for the first job in the chain, and the WR CRC mode bits are set to 0b011 for the last job in the chain. For this type of checking, the read effective length for the first job in the chain should be identical to the write effective length for the last job in the chain. Also, the first job read is prefetchable and address/length aligned to the bus size. In this example, the source of the first job in the chain and the destination of the last job in the chain are a same address. By setting the RD CRC mode bits appropriately for the first job and the WR CRC mode bits appropriately for the last job, and following the above parameters, intermediate jobs within the chain, between the first and last jobs, may include complex formats, such as striding, prefetchable, S/G formats, throttling, misalignment, or the like). If the comparison of the checksum values between the data read at the first job and the data written for the last job do not match, then an error bit in the FD of the last job is asserted to indicate an error occurred in the chain.

Figure 4:
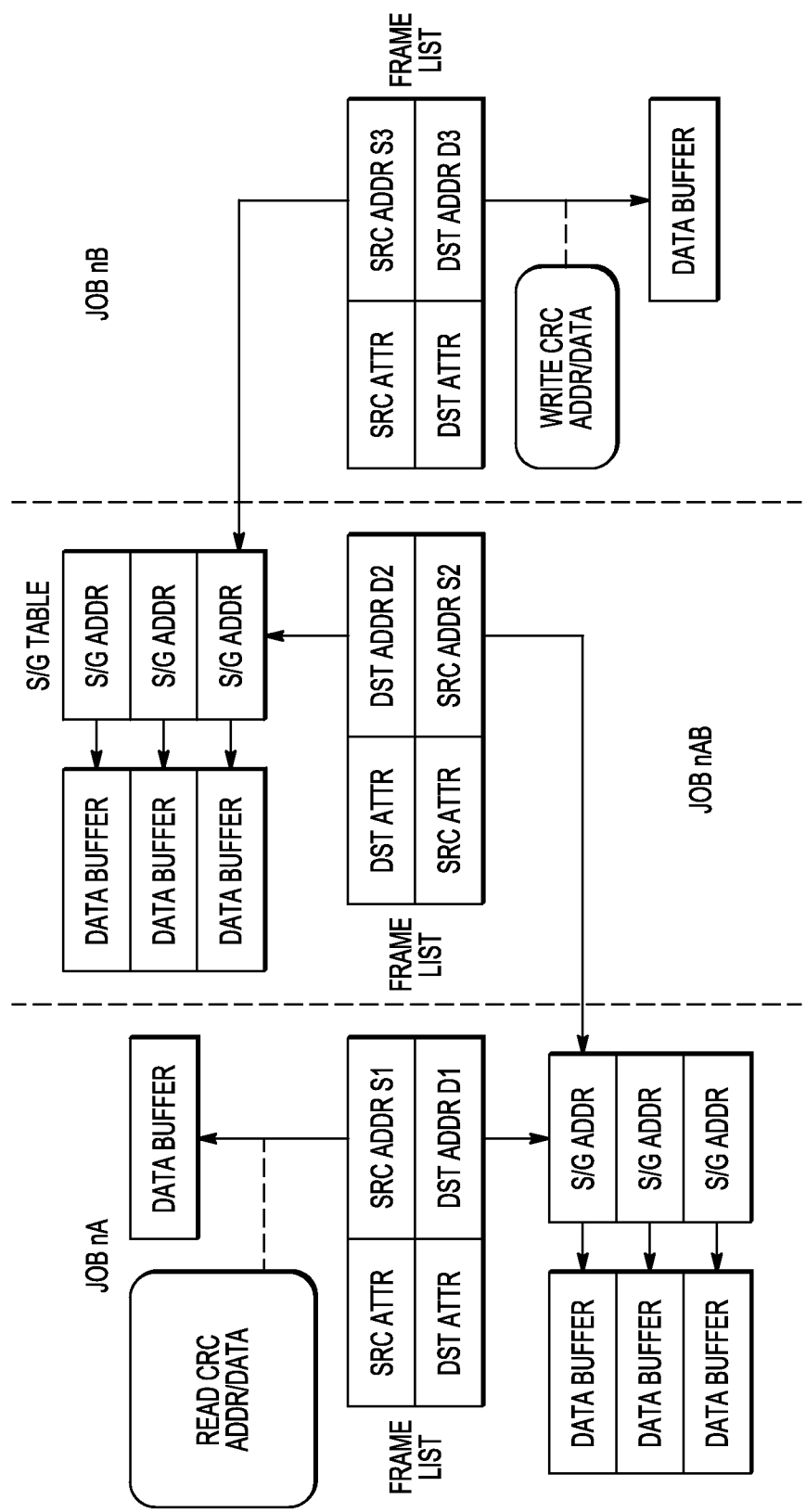
FIG. 4 illustrates, in diagrammatic form, a chain of transfer jobs in accordance with one embodiment of the present invention.

FIG. 4 illustrates an example of a job chain, n, including three data transfer jobs performed by DMA unit 120: job nA, job nAB, and job nB. Each job is completed before the next job starts to avoid reading data for the next job before the write has completed for the current job. Each job in chain n has a corresponding FD, which points to a corresponding frame list. In the current example, job nA transfers data from a source address S1, which is a single buffer, to a destination address D1 which addresses a S/G table. Therefore, the destination addresses for the data include 3 separate data buffers, as pointed to by each of the three S/G addresses. For job nA, the RD CRC mode bits can be set so as to generate checksums for both the read address and the read data.

After completion of job nA, job nAB is performed which transfers data from the source address S2 to destination address D2. Source address S2 corresponds to the S/G table which was the destination of previous job nA. Therefore, data from the data buffers pointed to by the S/G entries at D1 is read and stored to the data buffers pointed to by the S/G entries of the S/G table addressed by D2. For job nAB, note that the RD CRC and WR CRC mode bits may be set to the first value (e.g., 0bx00), so as to not perform any CRC checking.

After job nAB, job nB (corresponding to the final job in chain n) transfers data from the source address S3 to destination address D3. Source address S3 corresponds to the S/G table which was the destination of previous job nAB. Therefore, data from the data buffers pointed to by the S/G entries of the S/G table at D2 is read and stored to the single data buffer located at D3. For this job, the WR CRC mode bits may be set to perform error checking for the write data and write data address, as was described above. In this manner, error checking may be performed for chain n without having to generate any intermediate error results with chain n. That is, chain n may include any number of intermediate jobs between the first job (nA) and the last job (nB), and these intermediate jobs may use any format or attributes. However, by setting the RD CRC mode bits appropriately for the first job (nA) and the WR CRC mode bits appropriately for the last job (nB), an error for chain n can be detected. Note that if an error is indicated, it is not known where in the chain the error occurs, and further investigation may be needed to determine the exact location of the error.

Therefore, by now it can be understood how jobs within a chain of jobs can have corresponding mode bits which may be set in order to result in the self-checking of a job chain, even in those cases where intermediate jobs of the job chain have a complex format or implement complex features. Furthermore, in addition to mode bits, a user may provide comparand values which may be used for error detection for a job within a chain of jobs. Therefore, CRC generators/checkers (e.g. CRC units 218, 220, 222, and 224) are included within a DMA unit which snoops the read and write address and data conductors or buses and maintains CRC results for each active chain up to a maximum number of chains supported by the DMA unit.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The combination "0b" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 100 are circuitry located on a single integrated circuit or within a same device. Alternatively, system 100 may include any number of separate integrated circuits or separate devices interconnected with each other.

Although the invention is described herein with reference to specific embodiments, various modifications and changes can be made without departing from the scope of the present invention as set forth in the claims below. For example, the CRC information in each CRC unit may be organized differently and may include additional fields. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

One embodiment relates to a method for self-checking within direct memory access (DMA) system. A job chain includes a plurality of jobs, wherein each of the plurality of jobs comprises a source memory address, a destination memory address, an effective data length, a job chain identifier, and a mode identifier. The method includes generating a first check sum value for read data associated with a first job of the plurality of jobs, the first job comprising a read operation by a read data engine of the DMA to obtain the read data from a source memory address associated with the first job; if the mode identifier associated with the first job indicates that a first predetermined check value is available, comparing the first check sum value with the first predetermined check value; generating a second check sum value for write data associated with a last job of the plurality of jobs, the last job comprising a write operation of the write data by a write data engine of the DMA to a destination memory address associated with the last job; if the mode identifier associated with the last job indicates that a second predetermined check value is available, comparing the second check sum value with the second predetermined check value; and if the mode identifier associated with the last job does not indicate that the second predetermined check value is available, comparing the first check sum value with the second check sum value. In one aspect, the method further includes checking an effective read data length for the first job to ensure that it is the same as an effective write data length for the last job. In another aspect, the method further includes setting an error bit if the first check sum value is different from the second check sum value. In another aspect, the method further includes setting an error bit if the first check sum value is different from the first predetermined check value. In another aspect, the method further includes setting an error bit if the second check sum value is different from the second predetermined check value. In yet another aspect, at least one of the job chains in the plurality of job chains further comprises an intermediate job, the intermediate job executed between the first job and the last job. In a further aspect of the yet another aspect, the source address associated with the intermediate job is associated with data stored in a plurality of nonconsecutive memory locations. In another further aspect, the destination address associated with the intermediate job is associated with data stored in a plurality of nonconsecutive memory locations. In another aspect of the above embodiment, the method further includes, for each job chain in the plurality of job chains, checking an address alignment for the first job in the job chain to ensure that it is the same as an address alignment for the last job in the job chain, generating a third check sum value associated with a first address associated with the first job, generating a fourth check sum value associated with a second address associated with the last job, and comparing the third check sum value with the fourth check sum value.

Another embodiment is directed to a method for self-checking a direct memory access (DMA) system. A job chain includes a plurality of jobs, wherein each of the plurality of jobs comprises a source memory address, a destination memory address, an effective data length, a job chain identifier, and a mode identifier. The method of this another embodiment includes generating a first check sum value associated with a first address associated with a first job of the plurality of jobs, the first job comprising a read operation from the first address by a read data engine of the DMA; if the mode identifier associated with the first job indicates that a first predetermined check value is available, comparing the first check sum value with the first predetermined check value; generating a second check sum value associated with a second address associated with a last job of the plurality of jobs, the last job comprising a write operation to the second address by a write data engine of the DMA; if the mode identifier associated with the last job indicates that a second predetermined check value is available, comparing the second check sum value with the second predetermined check value; and if the mode identifier associated with the last job does not indicate that the second predetermined check value is available, comparing the first check sum value with the second check sum value. In one aspect of this another embodiment, the method further includes checking an address alignment for the first job to ensure that it is the same as an address alignment for the last job. In another aspect, the method further includes setting an error bit if the first check sum value is different from the second check sum value. In another aspect, the method further includes setting an error bit if the first check sum value is different from the first predetermined check value. In another aspect the method further includes setting an error bit if the second check sum value is different from the second predetermined check value.

Yet another embodiment relates to a system for self-checking within a direct memory access (DMA) system, in which the system includes a transaction scheduler operable to schedule a job chain comprising a plurality of jobs, wherein each of the plurality of jobs comprises a source memory address, a destination memory address, an effective data length, a job chain identifier, and a mode identifier; a read data engine operable to perform read operations; a write data engine operable to perform write operations; a read data check unit communicatively coupled to the transaction scheduler, the read data check unit operable to generate a first check sum value associated with data associated with a first job of the plurality of jobs, the first job comprising a read operation, and if the mode identifier associated with the first job indicates that a first predetermined check value is available, comparing the first check sum value with the first predetermined check value; and a write data check unit communicatively coupled to the transaction scheduler, the write data check unit operable to generate a second check sum value associated with data associated with a last job of the plurality of jobs, the last job comprising a write operation, if the mode identifier associated with the last job indicates that a second predetermined check value is available, comparing the second check sum value with the second predetermined check value, and if the mode identifier associated with the last job does not indicate that the second predetermined check value is available, comparing the first check sum value with the second check sum value. In one aspect, the write data check unit is further operable to set an error bit if the first check sum value is different from the second check sum value. In another aspect, the read data check unit is further operable to set an error bit if the first check sum value is different from the first predetermined check value. In another aspect, the write data check unit is further operable to set an error bit if the second check sum value is different from the second predetermined check value. In another aspect, the source address associated with at least one of the plurality of jobs is associated with data stored in a plurality of nonconsecutive memory locations. In another aspect, the system further includes a read address check unit operable to generate a third check sum value associated with a first address associated with the first job; and a write address check unit operable to generate a fourth check sum value associated with a second address associated with the last job, and compare the third check sum value with the fourth check sum value.

What is claimed is:

1. A method for self-checking within direct memory access (DMA) system, the method comprising:
for a job chain comprising a plurality of jobs, wherein each of the plurality of jobs comprises a source memory address, a destination memory address, an effective data length, a job chain identifier, and a mode identifier:
generating a first check sum value for read data associated with a first job of the plurality of jobs, the first job comprising a read operation by a read data engine of the DMA to obtain the read data from a source memory address associated with the first job;
if the mode identifier associated with the first job indicates that a first predetermined check value is available, comparing the first check sum value with the first predetermined check value;
generating a second check sum value for write data associated with a last job of the plurality of jobs, the last job comprising a write operation of the write data by a write data engine of the DMA to a destination memory address associated with the last job;
if the mode identifier associated with the last job indicates that a second predetermined check value is available, comparing the second check sum value with the second predetermined check value; and
if the mode identifier associated with the last job does not indicate that the second predetermined check value is available, comparing the first check sum value with the second check sum value.

2. The method of claim 1, further comprising checking an effective read data length for the first job to ensure that it is the same as an effective write data length for the last job.

3. The method of claim 1, further comprising setting an error bit if the first check sum value is different from the second check sum value.

4. The method of claim 1, further comprising setting an error bit if the first check sum value is different from the first predetermined check value.

5. The method of claim 1, further comprising setting an error bit if the second check sum value is different from the second predetermined check value.

6. The method of claim 1, wherein at least one of the job chains in the plurality of job chains further comprises an intermediate job, the intermediate job executed between the first job and the last job.

7. The method of claim 6, wherein the source address associated with the intermediate job is associated with data stored in a plurality of nonconsecutive memory locations.

8. The method of claim 6, wherein the destination address associated with the intermediate job is associated with data stored in a plurality of nonconsecutive memory locations.

9. The method of claim 1, further comprising, for each job chain in the plurality of job chains:
checking an address alignment for the first job in the job chain to ensure that it is the same as an address alignment for the last job in the job chain;
generating a third check sum value associated with a first address associated with the first job;
generating a fourth check sum value associated with a second address associated with the last job; and
comparing the third check sum value with the fourth check sum value.

10. A method for self-checking a direct memory access (DMA) system, the method comprising:
for a job chain comprising a plurality of jobs, wherein each of the plurality of jobs comprises a source memory address, a destination memory address, an effective data length, a job chain identifier, and a mode identifier:
generating a first check sum value associated with a first address associated with a first job of the plurality of jobs, the first job comprising a read operation from the first address by a read data engine of the DMA;
if the mode identifier associated with the first job indicates that a first predetermined check value is available, comparing the first check sum value with the first predetermined check value;
generating a second check sum value associated with a second address associated with a last job of the plurality of jobs, the last job comprising a write operation to the second address by a write data engine of the DMA;
if the mode identifier associated with the last job indicates that a second predetermined check value is available, comparing the second check sum value with the second predetermined check value; and
if the mode identifier associated with the last job does not indicate that the second predetermined check value is available, comparing the first check sum value with the second check sum value.

11. The method of claim 10, further comprising checking an address alignment for the first job to ensure that it is the same as an address alignment for the last job.

12. The method of claim 10, further comprising setting an error bit if the first check sum value is different from the second check sum value.

13. The method of claim 10, further comprising setting an error bit if the first check sum value is different from the first predetermined check value.

14. The method of claim 10, further comprising setting an error bit if the second check sum value is different from the second predetermined check value.

15. A system for self-checking within a direct memory access (DMA) system, the system comprising:
a transaction scheduler operable to schedule a job chain comprising a plurality of jobs, wherein each of the plurality of jobs comprises a source memory address, a destination memory address, an effective data length, a job chain identifier, and a mode identifier;
a read data engine operable to perform read operations;
a write data engine operable to perform write operations;
a read data check unit communicatively coupled to the transaction scheduler, the read data check unit operable to:
generate a first check sum value associated with data associated with a first job of the plurality of jobs, the first job comprising a read operation; and
if the mode identifier associated with the first job indicates that a first predetermined check value is available, comparing the first check sum value with the first predetermined check value; and
a write data check unit communicatively coupled to the transaction scheduler, the write data check unit operable to:
generate a second check sum value associated with data associated with a last job of the plurality of jobs, the last job comprising a write operation;
if the mode identifier associated with the last job indicates that a second predetermined check value is available, comparing the second check sum value with the second predetermined check value; and if the mode identifier associated with the last job does not indicate that the second predetermined check value is available, comparing the first check sum value with the second check sum value.

16. The system of claim 15, wherein the write data check unit is further operable to set an error bit if the first check sum value is different from the second check sum value.

17. The system of claim 15, wherein the read data check unit is further operable to set an error bit if the first check sum value is different from the first predetermined check value.

18. The system of claim 15, wherein the write data check unit is further operable to set an error bit if the second check sum value is different from the second predetermined check value.

19. The system of claim 15, wherein the source address associated with at least one of the plurality of jobs is associated with data stored in a plurality of nonconsecutive memory locations.

20. The system of claim 15, further comprising:
a read address check unit operable to:
generate a third check sum value associated with a first address associated with the first job; and
a write address check unit operable to:
generate a fourth check sum value associated with a second address associated with the last job; and
compare the third check sum value with the fourth check sum value.

* * * * *